(12) United States Patent
Ishikawa et al.

(10) Patent No.: US 12,486,881 B2
(45) Date of Patent: Dec. 2, 2025

(54) FLUID-FILLED VIBRATION DAMPING DEVICE

(71) Applicant: Sumitomo Riko Company Limited, Aichi (JP)

(72) Inventors: Ryota Ishikawa, Aichi (JP); Yoshihiro Kawabata, Aichi (JP); Yorishige Shimizu, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 373 days.

(21) Appl. No.: 18/076,403

(22) Filed: Dec. 7, 2022

(65) Prior Publication Data

US 2023/0106690 A1    Apr. 6, 2023

Related U.S. Application Data

(63) Continuation of application No. PCT/JP2021/044040, filed on Dec. 1, 2021.

(30) Foreign Application Priority Data

Dec. 21, 2020 (JP) ................. 2020-211611

(51) Int. Cl.
*F16F 13/10* (2006.01)
*B60K 5/12* (2006.01)

(52) U.S. Cl.
CPC .......... *F16F 13/106* (2013.01); *B60K 5/1283* (2013.01); *F16F 13/107* (2013.01); *F16F 2228/066* (2013.01)

(58) Field of Classification Search
CPC .................................................. F16F 13/106
See application file for complete search history.

(56) References Cited

U.S. PATENT DOCUMENTS

2013/0069289 A1    3/2013  Ishikawa et al.
2016/0195154 A1*   7/2016  Komiya ............... F16F 13/106
                                                  267/140.13
(Continued)

FOREIGN PATENT DOCUMENTS

JP    2012241842    12/2012

OTHER PUBLICATIONS

"Office Action of Japan Counterpart Application", issued on Feb. 14, 2024, with English translation thereof, p. 1-p. 6.

(Continued)

*Primary Examiner* — Melanie Torres Williams
(74) *Attorney, Agent, or Firm* — JCIPRNET (57) ABSTRACT

A fluid-filled vibration damping device includes a switching valve arranged inside the fluid passage passing through a partition member to communicate with a main fluid chamber and a sub fluid chamber and protruding from one wall surface toward the other wall surface of the fluid passage that face each other. A gap is provided between the switching valve and the other wall surface. A tip end part of the switching valve abuts against the other wall surface through a tilt displacement in a swing manner of the switching valve in the passage length direction of the fluid passage to thereby form a switching mechanism for closing the gap. An elastically deformable fin-shaped protrusion protruding from the tip end part of the switching valve toward the other wall surface is provided. A leak passage is formed between a protruding tip end of the fin-shaped protrusion and the other wall surface.

9 Claims, 7 Drawing Sheets

(56) References Cited

U.S. PATENT DOCUMENTS

2018/0051769 A1    2/2018  Kim
2019/0285133 A1*   9/2019  Ishikawa ............... F16F 13/106

OTHER PUBLICATIONS

"International Search Report (Form PCT/ISA/210) of PCT/JP2021/044040," mailed on Feb. 1, 2022, with English translation thereof, pp. 1-5.
"Written Opinion of the International Searching Authority (Form PCT/ISA/237) of PCT/JP2021/044040", mailed on Feb. 1, 2022, with English translation thereof, pp. 1-8.

* cited by examiner

FLUID-FILLED VIBRATION DAMPING DEVICE

CROSS-REFERENCE TO RELATED APPLICATION

The present application is a continuation of PCT/JP2021/044040, filed on Dec. 1, 2021, and is related to and claims priority from Japanese patent application no. 2020-211611, filed on Dec. 21, 2020. The entire contents of the aforementioned application are hereby incorporated by reference herein.

BACKGROUND

Technical Field

The disclosure relates to a fluid-filled vibration damping device used for, for example, an engine mount of an automobile.

Description of Related Art

Conventionally, a vibration damping device applied to an engine mount of an automobile and the like has been known. Further, there is also known a fluid-filled vibration damping device in which a main fluid chamber and a sub fluid chamber in which a fluid is filled are provided to improve the vibration damping performance by utilizing the flow action of the fluid.

By the way, the fluid-filled vibration damping device exhibits good vibration damping performance in a preset specific frequency range, but has a problem that it does not exhibit the intended vibration damping performance against vibration input with a frequency outside the specific frequency range. Therefore, in Japanese Patent Application Laid-Open No. 2012-241842 (Patent Literature 1) and the like, the applicant has proposed a fluid-filled vibration damping device capable of obtaining an effective vibration damping effect for vibration input in a wider frequency range. In Patent Literature 1, the vibration damping effect due to the flow action of the fluid flowing through the first orifice passage and the second orifice passage and the vibration damping effect based on the hydraulic pressure absorption action due to the minute displacement of the switching part are exerted in three mutually different frequency ranges.

RELATED ART

Patent Literature

[Patent Literature 1] Japanese Patent Application Laid-Open No. 2012-241842

SUMMARY

Technical Problem

However, in recent years, the requirements for vibration damping properties have been diversified. For example, different vibration damping properties are required for vibrations in regions of similar amplitudes and frequencies, and improvements in vibration damping performance for vibrations of higher frequencies and vibrations of smaller amplitudes are sometimes required.

The disclosure provides a fluid-filled vibration damping device which includes a new vibration damping mechanism, easily adapts to diversifying vibration damping properties, and has novel structure.

Solution to Problem

Hereinafter, exemplary embodiments for grasping the disclosure will be described, but each of the embodiments described below is described as an example, and not only may be appropriately combined with each other and adopted, but multiple components described in each embodiment may also be recognized and employed independently as much as possible, and may also be employed in combination with any component described in another embodiment as appropriate. Thereby, in the disclosure, various other embodiments may be realized without being limited to the embodiments described below.

A first aspect provides a fluid-filled vibration damping device having a structure in which a main fluid chamber and a sub fluid chamber filled with a fluid are partitioned by a partition member. The fluid-filled vibration damping device includes a fluid passage that penetrates the partition member and communicates with the main fluid chamber and the sub fluid chamber. The fluid passage is provided with a switching valve that protrudes from one wall surface toward an other wall surface of the fluid passage that face each other, and a gap is provided between the switching valve and the other wall surface. The switching valve is tiltable at its base end part, and a tip end part of the switching valve contacts the other wall surface of the fluid passage by a tilt displacement of the switching valve in a swing manner in a passage length direction of the fluid passage to close the gap, to configure a switching mechanism. An elastically deformable fin-shaped protrusion that protrudes from the tip end part of the switching valve toward the other wall surface of the fluid passage is provided, and a leak passage is formed between a protruding tip end part of the fin-shaped protrusion and the other wall surface.

According to the fluid-filled vibration damping device having a structure according to this aspect, in addition to switching the vibration damping properties by switching the communication and blockage of the fluid passage by the switching valve, vibration damping effects against a wider variety of input vibrations are exhibited by further switching of the vibration damping properties with the provision of the fin-shaped protrusion. That is, the vibration damping effect due to the fluid flow through the leak passage formed between the fin-shaped protrusion and the other wall surface of the fluid passage is exhibited, and at the time of vibration input in which the leak passage is substantially blocked, the vibration damping effect is exhibited by the elastic deformation of the fin-shaped protrusion.

In a second aspect, in the fluid-filled vibration damping device according to the first aspect, the other wall surface of the fluid passage is provided with a recess, and the fin-shaped protrusion enters the recess.

According to the fluid-filled vibration damping device having a structure according to this aspect, since the fin-shaped protrusion is disposed by entering the recess opening to the other wall surface of the fluid passage, the protrusion length of the fin-shaped protrusion may be lengthened. Therefore, the vibration damping effect due to the elastic deformation of the fin-shaped protrusion may be more effectively exhibited, and the degree of freedom in tuning the properties of the fin-shaped protrusion may be increased.

In a third aspect, the fluid-filled vibration damping device according to the first or second aspect further includes a rubber film sandwiched by the partition member, and the switching valve protrudes from a sandwiched part of the rubber film toward the other wall surface of the fluid passage and extends in a circumferential direction.

According to the fluid-filled vibration damping device having a structure according to this aspect, since the switching valve protrudes to the outer peripheral side, the communication part of the fluid passage is located on the outer peripheral side in the state where the switching valve is open, and it becomes easy to obtain a large passage cross-sectional area of the the fluid passage. Since the switching valve extends in the circumferential direction, the circumferential length of the fluid passage opened and closed by the switching valve is secured, and it becomes easy to obtain a large passage cross-sectional area of the fluid passage. Further, since the fin-shaped protrusion protrudes from the switching valve to the outer periphery, the leak passage is formed between the fin-shaped protrusion and the outer peripheral side wall surface of the fluid passage, and it becomes easy to obtain a large passage cross-sectional area of the leak passage.

In a fourth aspect, in the fluid-filled vibration damping device according to the third aspect, the switching valve is provided to protrude from the sandwiched part of the rubber film to an outer peripheral side over an entire periphery, and the fin-shaped protrusion is provided to protrude on an outer peripheral surface of the switching valve over the entire periphery.

According to the fluid-filled vibration damping device having a structure according to this aspect, since the switching valve is provided over the entire periphery, the circumferential length of the fluid passage opened and closed by the switching valve may be set with a large degree of freedom, and this makes it possible to obtain a large degree of freedom in tuning the fluid passage. Further, since the fin-shaped protrusion protruding on the outer peripheral surface of the switching valve is provided over the entire periphery, the circumferential length of the leak passage may be set with a large degree of freedom, and this makes it possible to obtain a large degree of freedom in tuning the leak passage. The size of the area where the hydraulic pressure acts on the fin-shaped protrusion may be set with a large degree of freedom, and the vibration damping properties exhibited by the fin-shaped protrusion may be tuned with a large degree of freedom.

In a fifth aspect, in the fluid-filled vibration damping device according to any of the first to fourth aspects, the tip end part of the fin-shaped protrusion has a thick tip end part that is thicker than a base end part of the fin-shaped protrusion in the passage length direction of the fluid passage.

According to the fluid-filled vibration damping device having a structure according to this aspect, the fin-shaped protrusion is provided with a thick tip end part, whereby the base end part of the fin-shaped protrusion part is made thin, and the spring constant of the base end part is reduced; by making the tip end part of the fin-shaped protrusion thick, it is possible to stabilize the shape of the tip end part that tends to vary during manufacturing.

In a sixth aspect, in the fluid-filled vibration damping device according to any of the first to fifth aspects, the tip end part of the fin-shaped protrusion is a proximate part in which at least a part in the circumferential direction is separated from the other wall surface of the fluid passage, and the proximate part forms the leak passage.

According to the fluid-filled vibration damping device having a structure according to this aspect, the fin-shaped protrusion is separated from the other wall surface of the fluid passage at the part where the leak passage is formed, so that, for example, a fluid flow through the leak passage is not hindered due to the fin-shaped protrusion being caught on the other wall surface of the fluid passage. Therefore, the vibration damping effect of the leak passage is stably exhibited.

In a seventh aspect, in the fluid-filled vibration damping device according to any of the first to sixth aspects, the fin-shaped protrusion is in contact with the other wall surface of the fluid passage over the entire periphery, and the fin-shaped protrusion is separated from the other wall surface by elastic deformation to form the leak passage.

According to the fluid-filled vibration damping device having a structure according to this aspect, the communication and blockage of the leak passage are switched by the fin-shaped protrusion, so that it is possible to change the vibration damping property to a greater extent by switching by the elastic deformation of the fin-shaped protrusion.

In an eighth aspect, in the fluid-filled vibration damping device according to any one of the first to seventh aspects, the tip end part of the switching valve has a shape extending to both sides in the passage length direction of the fluid passage, and the fin-shaped protrusion protrudes from an intermediate part of the tip end part of the switching valve in the passage length direction of the fluid passage.

According to the fluid-filled vibration damping device having a structure according to this aspect, due to the tilt displacement of the switching valve in a swing manner, both side parts of the tip end part of the switching valve in the passage length direction of the fluid passage are in contact with the inner surface of the other wall of the fluid passage to reliably block the fluid passage. Since the fin-shaped protrusion protrudes from the intermediate part of the tip end part of the switching valve, the contact of the switching valve with the inner surface of the other wall of the fluid passage during the tilt displacement of the switching valve in a swing manner is less likely to be hindered by the fin-shaped protrusion.

In a ninth aspect, the fluid-filled vibration damping device according to any one of the first to eighth aspects further includes an orifice passage that communicates the main fluid chamber and the sub fluid chamber with each other, and the resonance frequency of a fluid flow through the orifice passage is lower than the resonance frequency of a fluid flow through the fluid passage.

According to the fluid-filled vibration damping device having a structure according to this aspect, the vibration damping effect due to the fluid flow through the orifice passage is exhibited. In addition, when vibration is input at a frequency higher than the resonance frequency of the fluid flow through the orifice passage, the vibration damping effect due to the fluid flow through the fluid passage is exhibited, whereby it is possible to prevent the dynamic spring from becoming high due to the orifice passage being substantially closed.

Effects

According to the disclosure, a fluid-filled vibration damping device may be provided which includes a new vibration damping mechanism and easily adapts to diversifying vibration damping properties.

DESCRIPTION OF EMBODIMENTS

Hereinafter, embodiments of the disclosure will be described with reference to the drawings.

Figure 1:
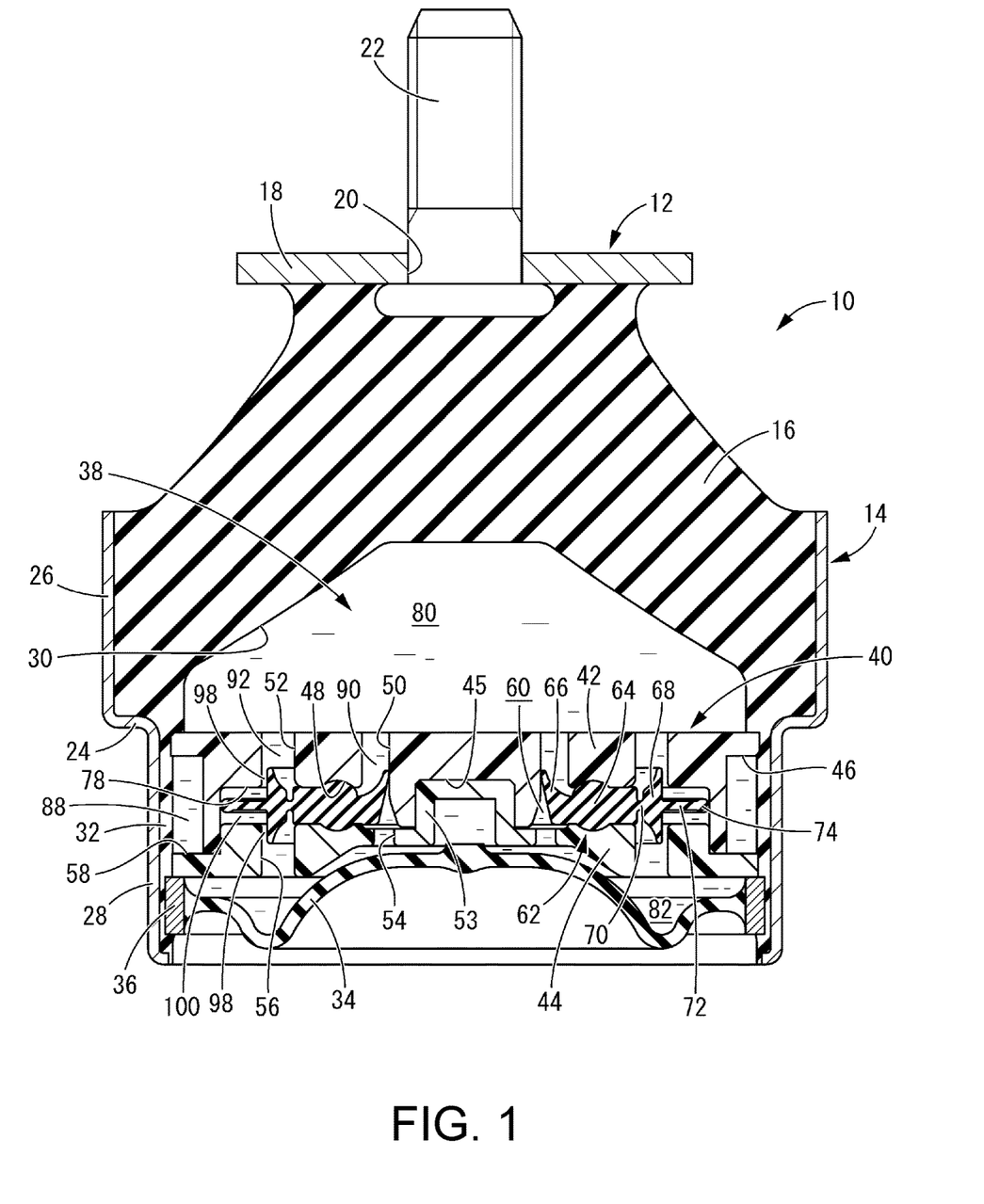
FIG. 1 is a cross-sectional view showing an engine mount as a first embodiment of the disclosure.

FIG. 1 shows an engine mount 10 for an automobile as a first embodiment of a fluid-filled vibration damping device having a structure according to the disclosure. The engine mount 10 has a structure in which a first mounting member 12 and a second mounting member 14 are elastically connected by a main rubber elastic body 16. In the following description, as a general rule, the vertical direction refers to the vertical direction in FIG. 1 which is the direction of the central axis of the mount.

The first mounting member 12 is a hard member made of metal or the like. The first mounting member 12 includes a substantially disk-shaped fixing member 18. A through hole 20 penetrating in the vertical direction is provided in the central part of the fixing member 18 in the radial direction. A mounting bolt 22 is inserted through the through hole 20 from below to above, and the mounting bolt 22 is fixed to the fixing member 18.

The second mounting member 14 is a hard member made of metal or the like, and has a thin-walled large-diameter substantially cylindrical shape. The second mounting member 14 is provided with an annular step part 24 in the central part in the axial direction, and the upper side of the step part 24 is a large-diameter cylinder part 26 and the lower side is a small-diameter cylinder part 28. As a result, the second mounting member 14 has a stepped cylindrical shape as a whole.

The first mounting member 12 is disposed on the upper side of the second mounting member 14 on substantially the same central axis, and the first mounting member 12 and the second mounting member 14 are elastically connected by the main rubber elastic body 16. The main rubber elastic body 16 has a substantially truncated cone shape with a thick wall and a large diameter, and is vulcanized and bonded to the first mounting member 12 at the small-diameter side end part, and is vulcanized and bonded to the second mounting member 14 and is overlapped with it at the outer peripheral surface of the large-diameter side end part. The main rubber elastic body 16 is formed as an integrally vulcanized molded product including the first mounting member 12 and the second mounting member 14.

The main rubber elastic body 16 is provided with a large-diameter recess 30 that opens on the lower surface, which is the large-diameter side end surface. The large-diameter recess 30 has a substantially mortar shape in the opposite direction as a whole, and gradually increases in diameter from the upper bottom surface toward the opening side, and extends vertically with a substantially constant diameter in the vicinity of the opening.

A seal rubber layer 32 is integrally formed on the main rubber elastic body 16. The seal rubber layer 32 has a thin-walled large-diameter substantially cylindrical shape, and extends downward from the outer peripheral side of the opening of the large-diameter recess 30. The seal rubber layer 32 is fixed to the inner peripheral surface of the small-diameter cylinder part 28 of the second mounting member 14, and substantially the entire inner peripheral surface of the second mounting member 14 is covered by the main rubber elastic body 16 and the seal rubber layer 32.

A flexible film 34 is attached to the lower opening of the second mounting member 14. The flexible film 34 is a disk-shaped rubber film as a whole, and has a dome shape in which the outer peripheral part has slack and the inner peripheral part is convex upward. The outer peripheral surface of the flexible film 34 is fixed to an annular fixing member 36. Then, in a state where the fixing member 36 is inserted into the lower opening of the second mounting member 14, the fixing member 36 is fixed to the second mounting member 14 by subjecting the second mounting member 14 to a diameter-reducing process such as 360 degree radial compression. As a result, the flexible film 34 is attached to the second mounting member 14, and the lower opening of the second mounting member 14 is fluid-tightly closed by the flexible film 34.

By attaching the flexible film 34 to the second mounting member 14, a fluid-filled region 38 is formed between the main rubber elastic body 16 and the flexible film 34. The fluid-filled region 38 is fluid-tightly sealed with respect to the external space, and an incompressible fluid is filled. As the incompressible fluid, for example, a fluid such as water, ethylene glycol, alkylene glycol, polyalkylene glycol, silicone oil, or a mixture thereof is preferably adopted. The incompressible fluid is preferably a low-viscosity fluid having a viscosity of 0.1 Pa·s or less in order to efficiently exert the vibration damping effect based on the flow action of the fluid.

Figure 2:
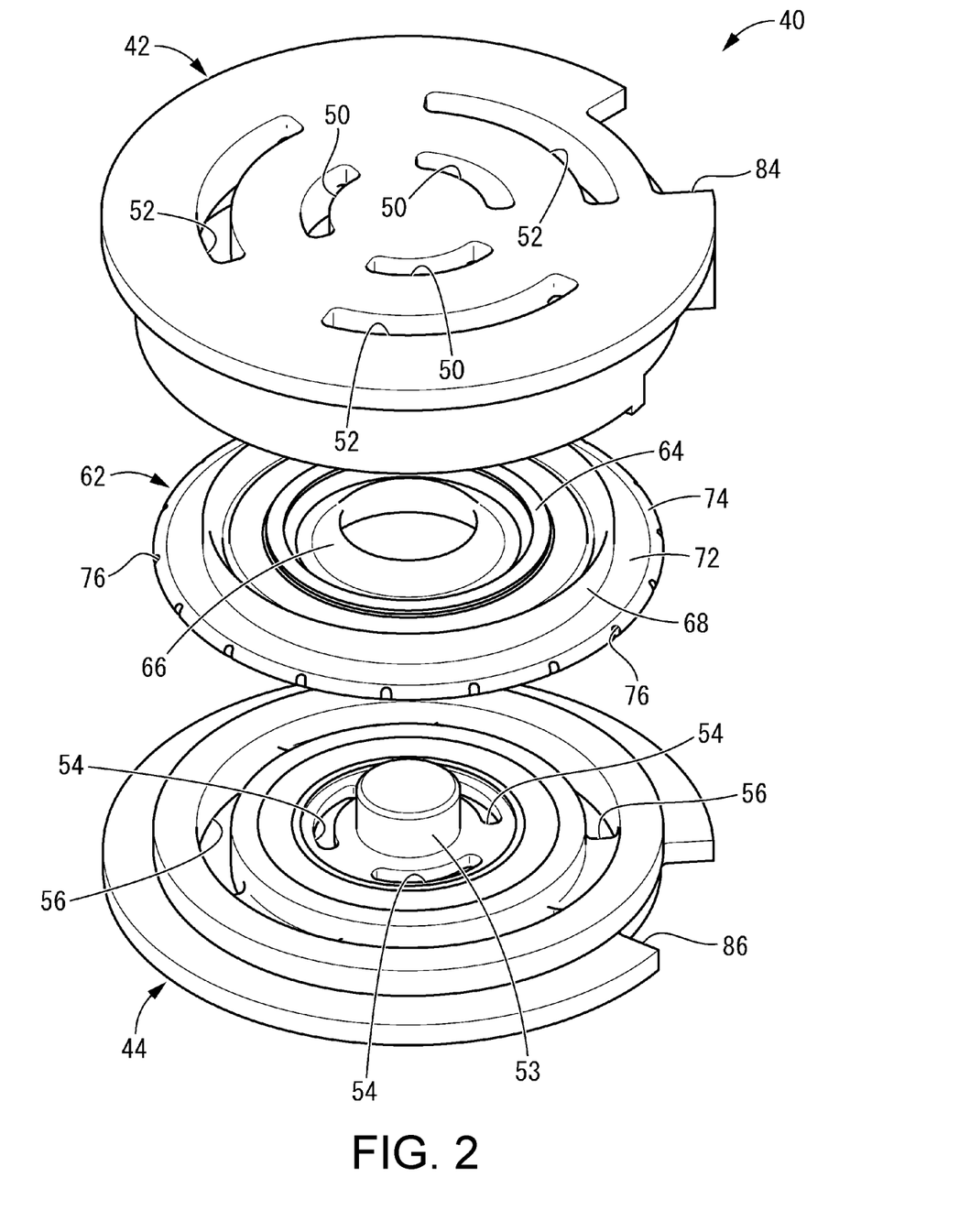
FIG. 2 is an exploded perspective view of a partition member configuring the engine mount shown in FIG. 1.

A partition member 40 is disposed in the fluid-filled region 38. The partition member 40 has a substantially disk shape as a whole. As shown in FIG. 2, the partition member 40 includes a first partition plate 42 and a second partition plate 44.

The first partition plate 42 is a hard member made of synthetic resin, metal, or the like, and has a substantially disk shape as a whole. The first partition plate 42 includes a fitting recess 45 that opens to the lower surface at the central part in the radial direction. The first partition plate 42 includes a notch-shaped part 46 that opens to the lower surface and the outer peripheral surface at the outer peripheral end part. The first partition plate 42 includes a storage recess 48 that opens to the lower surface in the middle in the radial direction, which is the outer periphery of the fitting recess 45 and the inner periphery of the notch-shaped part 46. A first relief hole 50 penetrating in the vertical direction is formed in the inner peripheral part of the storage recess 48. A first flow path forming hole 52 penetrating in the vertical direction is formed in the outer peripheral part of the accommodating recess 48.

The second partition plate 44 is a hard member made of synthetic resin, metal, or the like, and has a substantially disk shape as a whole. The second partition plate 44 includes a fitting protrusion 53 that protrudes upward at the central part in the radial direction. The second partition plate 44 is formed with a second relief hole 54 penetrating in the vertical direction in the middle of the radial direction, which is the outer periphery of the fitting recess 45, and a second flow path forming hole 56 penetrating in the vertical direction through the outer periphery of the second relief hole 54.

The first partition plate 42 and the second partition plate 44 are vertically overlapped with each other. The fitting protrusion 53 of the second partition plate 44 is fitted into the fitting recess 45 of the first partition plate 42, and the inner peripheral wall part of the notch-shaped part 46 of the first partition plate 42 is fitted onto the upper outer peripheral surface of the second partition plate 44 so that the first partition plate 42 and the second partition plate 44 are positioned relative to each other.

By combining the first partition plate 42 and the second partition plate 44 with each other, the lower opening of the notch-shaped part 46 of the first partition plate 42 is closed by the second partition plate 44, and a peripheral groove 58 that opens on the outer peripheral surface and extends in the circumferential direction is formed. In this embodiment, the peripheral groove 58 extends with a length of less than one circumference, but it may extend with a length of more than one circumference in the circumferential direction, for example, by extending in a spiral shape.

Further, the opening of the storage recess 48 is covered with the second partition plate 44, and a storage space 60 is formed between the first partition plate 42 and the second partition plate 44. The storage space 60 is an annular space extending around the peripheral wall of the fitting recess 45, and the first and second relief holes 50 and 54 are communicated with the inner peripheral part, and the first and second flow path forming holes 52 and 56 are communicated with the outer peripheral part.

Figure 3:
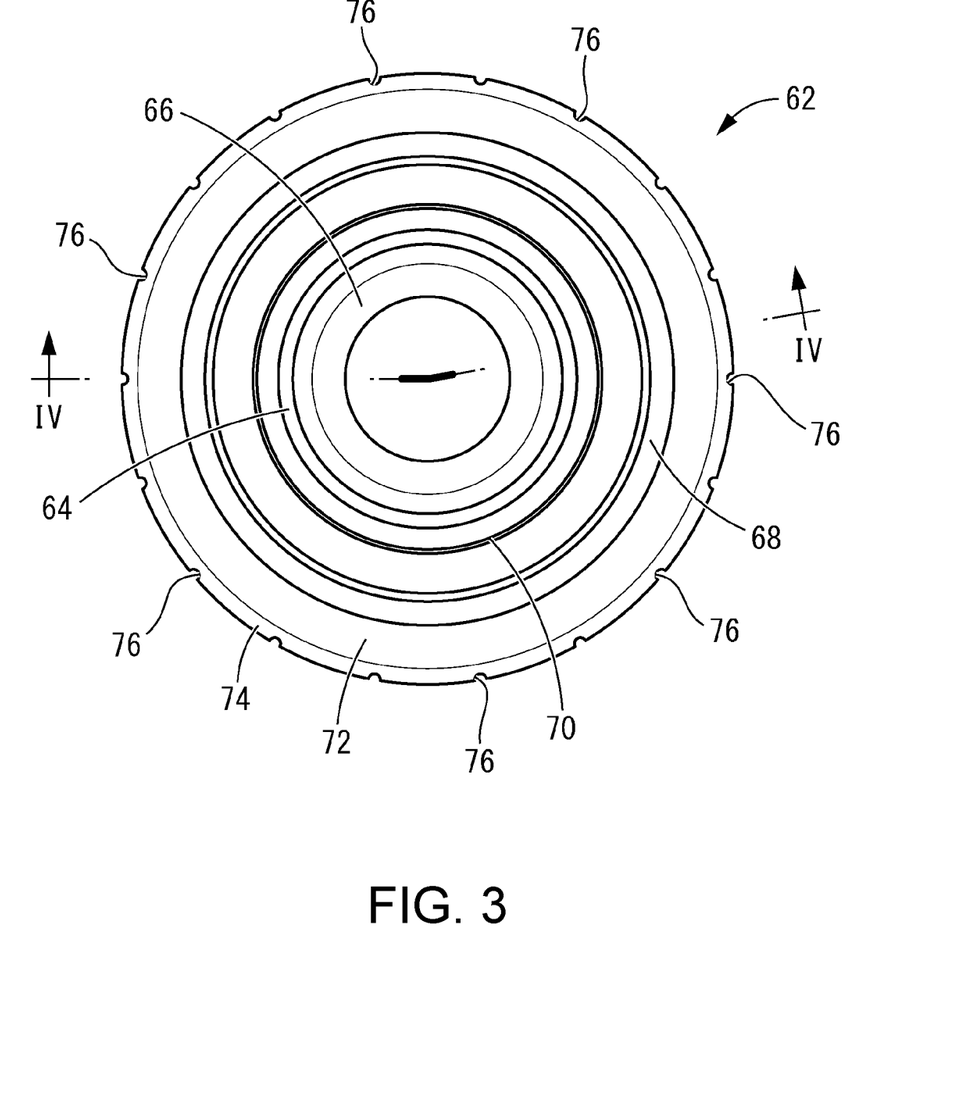
FIG. 3 is a plan view of an elastic movable body configuring the engine mount shown in FIG. 1.
Figure 4:
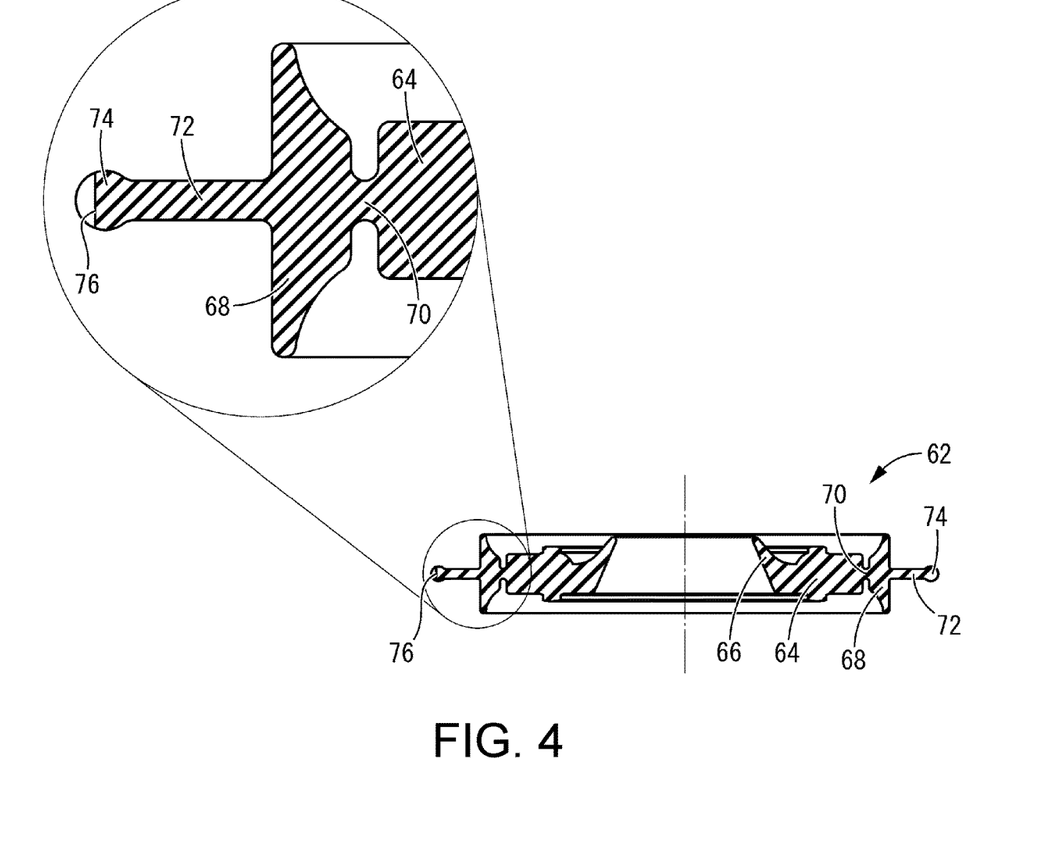
FIG. 4 is a cross-sectional view taken along the line IV-IV of FIG. 3.

An elastic movable body 62 as a rubber film is disposed in the storage space 60. As shown in FIGS. 3 and 4, the elastic movable body 62 has an annular shape as a whole and is formed of a rubber elastic body. The elastic movable body 62 includes a sandwiched part 64 that is sandwiched between the first partition plate 42 and the second partition plate 44. The sandwiched part 64 has a substantially constant cross-sectional shape and is an annular shape that extends continuously in the circumferential direction, and is vertically sandwiched between the first partition plate 42 and the second partition plate 44 at the outer periphery of the first and second relief holes 50 and 54 and the inner periphery of the first and second flow path forming holes 52 and 56, and is fixed to the partition member 40.

A relief valve 66 is provided on the inner peripheral side of the sandwiched part 64. The relief valve 66 is integrally formed with the sandwiched part 64, and protrudes from the sandwiched part 64 toward the inner periphery. More specifically, in the relief valve 66, the base end part protrudes from the sandwiched part 64 toward the inner periphery in a direction substantially perpendicular to the axis, and the tip end part protrudes from the base end part toward the inner periphery side. The cross-sectional shape of the tip end part of the relief valve 66 is such that the upper surface and the lower surface are inclined upward, which is the side of the first partition plate 42 toward the inner periphery. The tip end part of the relief valve 66 is gradually thinned in the vertical direction toward the inner periphery. The relief valve 66 is located on an extension of the first and second relief holes 50 and 54 in a state where the elastic movable body 62 is disposed in the storage space 60. The tip end part of the relief valve 66 is pressed against the inner peripheral wall surface of the storage space 60 in a state where the elastic movable body 62 is disposed in the storage space 60.

The elastic movable body 62 includes a switching valve 68 that protrudes from the sandwiched part 64 toward the outer peripheral side. The switching valve 68 has an annular shape extending in the circumferential direction and has a symmetrical shape in the vertical direction. The inner peripheral surface and the outer peripheral surface of the switching valve 68 are cylindrical surfaces, and the upper and lower end surfaces are tapered surfaces that incline outward in the vertical direction toward the outer periphery. In other words, the switching valve 68 has a shape that protrudes to both outer sides in the vertical direction, and the tip end part that protrudes to both sides in the vertical direction gradually becomes thinner in the radial direction toward the outer side in the vertical direction. The switching valve 68 has a curved surface whose protruding end surface in the vertical direction is arc-shaped. The upper tip end part of the switching valve 68 is inserted into the first flow path forming hole 52, and the lower tip end part is inserted into the second flow path forming hole 56.

The inner peripheral side of the switching valve 68 is integrally connected to the sandwiched part 64 by a thin part 70. The thickness of the thin part 70 in the vertical direction is thinner than the thickness of the inner peripheral end of the switching valve 68, and the thickness dimension is preferably smaller than half of the inner peripheral end of the switching valve 68. The radial width dimension of the thin part 70 is smaller than the radial width dimension of the switching valve 68. Since the sandwiched part 64 and the switching valve 68 are connected via the thin part 70, the swinging displacement of the switching valve 68 with respect to the sandwiched part 64 on both the upper and lower sides is allowed by the deformation of the thin part 70, and the switching valve 68 may be tilted around the base end side.

A fin-shaped protrusion 72 protrudes on the outer peripheral surface of the switching valve 68. As shown in FIG. 4, the fin-shaped protrusion 72 has a thin film shape that is continuous over the entire periphery, and protrudes from the switching valve 68 toward the outer periphery over the entire periphery. The fin-shaped protrusion 72 is integrally formed with the switching valve 68, and is elastically deformable. The fin-shaped protrusion 72 protrudes from the intermediate part off the tip end parts on both sides of the switching valve 68 in the vertical direction, and more preferably protrudes from the central part in the vertical direction. The outer peripheral end part, which is the protruding tip end part of the fin-shaped protrusion 72, includes a thick tip end part 74 having a wall thickness thicker than that of the protruding base end part. The thick tip end part 74 has a substantially circular cross section in the vertical cross section. By providing the thick tip end part 74, the fin-shaped protrusion 72 prevents molding defects and ensures deformation rigidity at the thick tip end part 74 while reducing the spring constant of the thin part on the inner peripheral side of the thick tip end part 74.

At the outer peripheral end of the fin-shaped protrusion 72, a groove-shaped part 76 that opens on the outer peripheral surface and penetrates in the vertical direction is provided. Although there may be only one groove-shaped part 76, multiple groove-shaped parts 76 are preferably provided in the circumferential direction, and for example, multiple groove-shaped parts 76 are provided at substantially equal intervals in the circumferential direction. The groove-shaped part 76 is preferably provided at the thick tip end part 74, whereby the cross-sectional shape is stabilized.

The switching valve 68 is located on the extension of the first and second flow path forming holes 52 and 56 in a state where the elastic movable body 62 is disposed in the storage space 60. The switching valve 68 is disposed so that its outer peripheral surface faces the wall surfaces on the outer peripheral side of the first and second flow path forming holes 52 and 56 so as to be separated from each other as a whole in a state where the elastic movable body 62 is disposed in the storage space 60.

A recess 78 is provided on the outer peripheral side of the first and second flow path forming holes 52 and 56. The recess 78 is open to the outer peripheral side wall surface 96, which is the other wall surface of a fluid passage 92 (to be described later), and the wall surface on the outer peripheral side of the recess 78 configures a part of the outer peripheral side wall surface 96. The recess 78 is continuously provided over the entire periphery and opens toward the inner periphery. The recess 78 of this embodiment is configured by utilizing the outer peripheral end part of the storage recess 48 of the first partition plate 42, and is provided between the overlapping surfaces of the first partition plate 42 and the second partition plate 44.

In a state where the elastic movable body 62 is disposed in the storage space 60, the fin-shaped protrusion 72 has entered the recess 78. Both the upper and lower surfaces of the fin-shaped protrusion 72 are separated from the upper and lower wall surfaces of the recess 78. In the fin-shaped protrusion 72, the thick tip end part 74, which is the outer peripheral end part, is in contact with the wall surface on the outer peripheral side of the recess 78. The fin-shaped protrusion 72 is separated from the wall surface (outer peripheral side wall surface 96) on the outer peripheral side of the recess 78 in the part where the groove-shaped part 76 that opens to the outer peripheral surface is formed, and the part where the groove-shaped part 76 is formed is a part proximate to the outer peripheral side wall surface 96.

The partition member 40 having such a structure is disposed in the fluid-filled region 38. The partition member 40 extends in the fluid-filled region 38 in the direction perpendicular to the axis, and its outer peripheral surface is pressed against the small-diameter cylinder part 28 of the second mounting member 14 via the seal rubber layer 32, and its outer peripheral end part is sandwiched between the main rubber elastic body 16 and the fixing member 36 in the axial direction, whereby it is positioned.

The fluid-filled region 38 is divided into upper and lower parts by the partition member 40. Above the partition member 40, a part of the wall part is formed of the main rubber elastic body 16, and a pressure receiving chamber 80 as a main fluid chamber that induces internal pressure fluctuation at the time of vibration input is formed. Below the partition member 40, a part of the wall part is formed of a flexible film 34, and an equilibrium chamber 82 as a sub fluid chamber to which a volume change is allowed is formed. An incompressible fluid is filled in each of the pressure receiving chamber 80 and the equilibrium chamber 82.

The opening of the peripheral groove 58 provided in the partition member 40 is covered with the second mounting member 14 to which the seal rubber layer 32 is fixed, and a tunnel-shaped flow path extending in the circumferential direction is formed. One end of this tunnel-shaped flow path is communicated with the pressure receiving chamber 80 through a first communication port 84, and the other end is communicated with the equilibrium chamber 82 through a second communication port 86. An orifice passage 88 that communicates the pressure receiving chamber 80 and the equilibrium chamber 82 with each other is configured to include the peripheral groove 58. The orifice passage 88 is tuned and set for low-frequency large-amplitude vibration corresponding to, for example, an engine shake.

The first relief hole 50 penetrating the upper side wall of the storage space 60 configured by the first partition plate 42 communicates with the pressure receiving chamber 80 at the upper end openings opened at three locations in the circumferential direction. The second relief hole 54 penetrating the lower side wall of the storage space 60 configured by the second partition plate 44 communicates with the equilibrium chamber 82 at the lower end openings opened at three locations in the circumferential direction. As a result, the relief passage 90 that penetrates the partition member 40 and communicates the pressure receiving chamber 80 and the equilibrium chamber 82 with each other is configured to include the first relief hole 50 and the second relief hole 54.

The relief valve 66 of the elastic movable body 62 is disposed in the middle of the fluid flow direction (flow path length direction) of the relief passage 90, and the relief valve 66 is pressed against the inner peripheral side wall part of the relief passage 90. As a result, the relief passage 90 is blocked by the relief valve 66.

The first flow path forming hole 52 penetrating the upper side wall of the storage space 60 configured by the first partition plate 42 communicates with the pressure receiving chamber 80 at the upper end openings opened at three locations in the circumferential direction. The second flow path forming hole 56 penetrating the lower side wall of the storage space 60 configured by the second partition plate 44 communicates with the equilibrium chamber 82 at the lower end openings opened at three locations in the circumferential direction. As a result, the fluid passage 92 that penetrates the partition member 40 and communicates the pressure receiving chamber 80 and the equilibrium chamber 82 with each other is configured to include the first flow path forming hole 52 and the second flow path forming hole 56. The fluid passage 92 is tuned and set for medium-frequency medium-amplitude vibration corresponding to, for example, an idling vibration. In the fluid passage 92, one wall surface orthogonal to the flow path length direction is designated as an inner peripheral side wall surface 94, and the other wall surface of the fluid passage 92 is designated as an outer peripheral side wall surface 96.

The switching valve 68 of the elastic movable body 62 is disposed inside the fluid passage 92. The switching valve 68 protrudes from the inner peripheral side wall surface 94 toward the outer peripheral side wall surface 96 of the fluid passage 92. Gaps 98 and 98 are formed between the outer peripheral surface of the switching valve 68 and the outer peripheral side wall surface 96 of the fluid passage 92, and the switching valve 68 is disposed to be separated from the outer peripheral side wall surface 96 of the fluid passage 92 in a proximate state. Then, a leak passage 100 that communicates both upper and lower sides of the switching valve 68 is formed by the facing space between the outer peripheral surface of the switching valve 68 and the outer peripheral side wall surface 96 of the fluid passage 92, the facing space between the fin-shaped protrusion 72 and the recess 78 in the vertical direction, and the groove-shaped part 76. The leak passage 100 is formed so as to extend between the thick tip end part 74 of the fin-shaped protrusion 72 and the outer peripheral side wall surface of the recess 78 which is a part of the outer peripheral side wall surface 96 of the fluid passage 92, and is communicated with the pressure receiving chamber 80 and the equilibrium chamber 82 via the fluid passage 92. The leak passage 100 is tuned and set for micro-amplitude vibration corresponding to, for example, a traveling vibration.

The engine mount 10 having such a structure is mounted on the vehicle by, for example, the first mounting member 12 being mounted on a power unit (not shown) and the second mounting member 14 being mounted on a vehicle body (not shown). The first mounting member 12 may be mounted on the power unit via an inner bracket or the like (not shown). The second mounting member 14 may be mounted on the vehicle body via an outer bracket or the like (not shown).

When a low-frequency large-amplitude vibration corresponding to an engine shake or the like is input while it is mounted on a vehicle, a relative pressure fluctuation is induced between the pressure receiving chamber 80 and the equilibrium chamber 82, and the fluid flow through the orifice passage 88 is actively generated in a resonance state, and a vibration damping effect based on the flow action of the fluid is exhibited.

Figure 5:
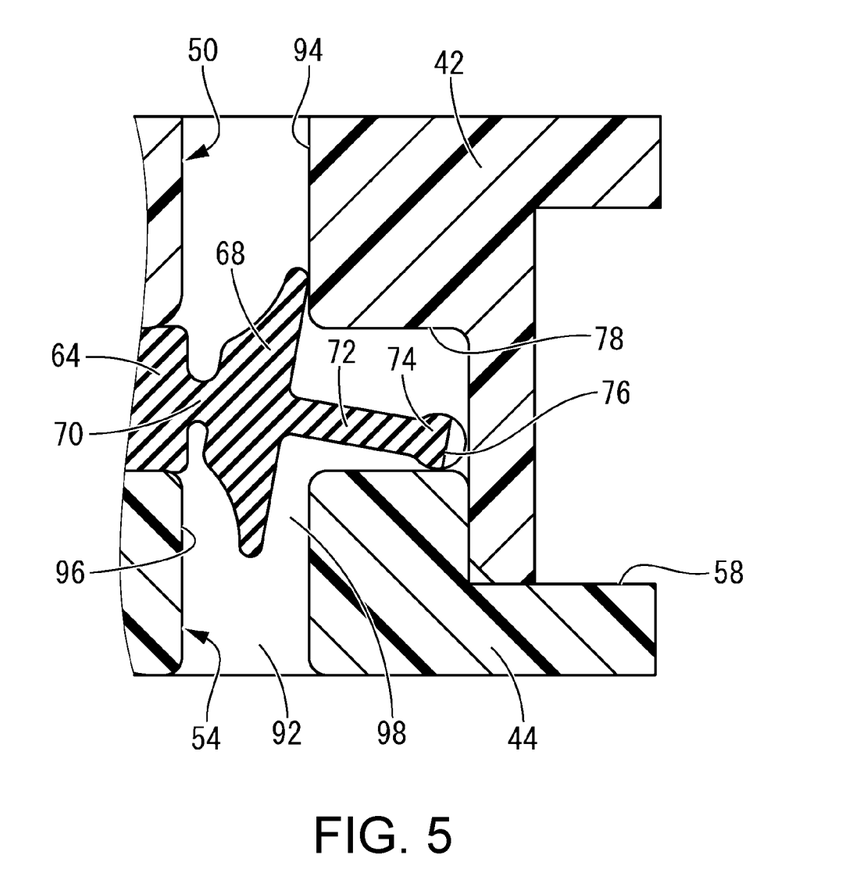
FIG. 5 is an enlarged cross-sectional view showing a part of the engine mount of FIG. 1, showing a state in which a shake vibration is input.

At the time of an input of a low-frequency large-amplitude vibration, the fluid passage 92 and the leak passage 100 are blocked by the switching valve 68 of the elastic movable body 62. That is, as shown in FIG. 5, the switching valve 68 tilts and displaces in a swing manner with the thin part 70 as the swing center, and the upper and lower end parts of the switching valve 68 come into contact with the outer peripheral side wall surface 96 of the fluid passage 92, whereby the fluid passage 92 and the leak passage 100 are blocked. This prevents the relative pressure fluctuation between the pressure receiving chamber 80 and the equilibrium chamber 82 from being reduced by the fluid flow through the fluid passage 92 and the leak passage 100, and efficiently generates the fluid flow through the orifice passage 88, and the vibration damping effect of the orifice passage 88 may be effectively obtained. In this way, the fluid passage 92 and the leak passage 100 are blocked by the switching mechanism that closes the gap 98 when the switching valve 68 comes into contact with the outer peripheral side wall surface 96 of the fluid passage 92.

Since the switching valve 68 protrudes from the sandwiched part 64 to the outer periphery, elastic deformation of the switching valve 68 is likely to occur. Since the upper and lower tip end parts of the switching valve 68 that abuts on the outer peripheral side wall surface 96 of the fluid passage 92 have a small radial thickness dimension, hit sound is reduced when the switching valve 68 abuts against the outer peripheral side wall surface 96 of the fluid passage 92 in the substantially radial direction due to the swinging displacement. Since the tip end part (upper and lower end parts) of the switching valve 68 is shaped to extend to both the upper and lower sides and the fin-shaped protrusion 72 protrudes from the intermediate part of the switching valve 68, while the fin-shaped protrusion 72 enters the recess 78, the switching valve 68 and the outer peripheral side wall surface 96 of the fluid passage 92 may be brought into contact with each other on both upper and lower sides of the recess 78.

At the time of an input of a medium-frequency medium-amplitude vibration corresponding to an idling vibration or the like, based on the flow action of the fluid or fluid column resonance action through the fluid passage 92 that is substantially maintained in a communicating state, for example, a vibration damping effect may be obtained due to the low dynamic spring properties. That is, when the input vibration is a medium-amplitude vibration, the swinging displacement of the switching valve 68 is generated within a range that does not reach the contact with the outer peripheral side wall surface 96, so that fluid flow through the fluid passage 92 is allowed with the swinging displacement of the switching valve 68. Therefore, based on the tuning of the fluid passage 92, for example, a low dynamic spring property against an idling vibration may be realized.

Figure 6:
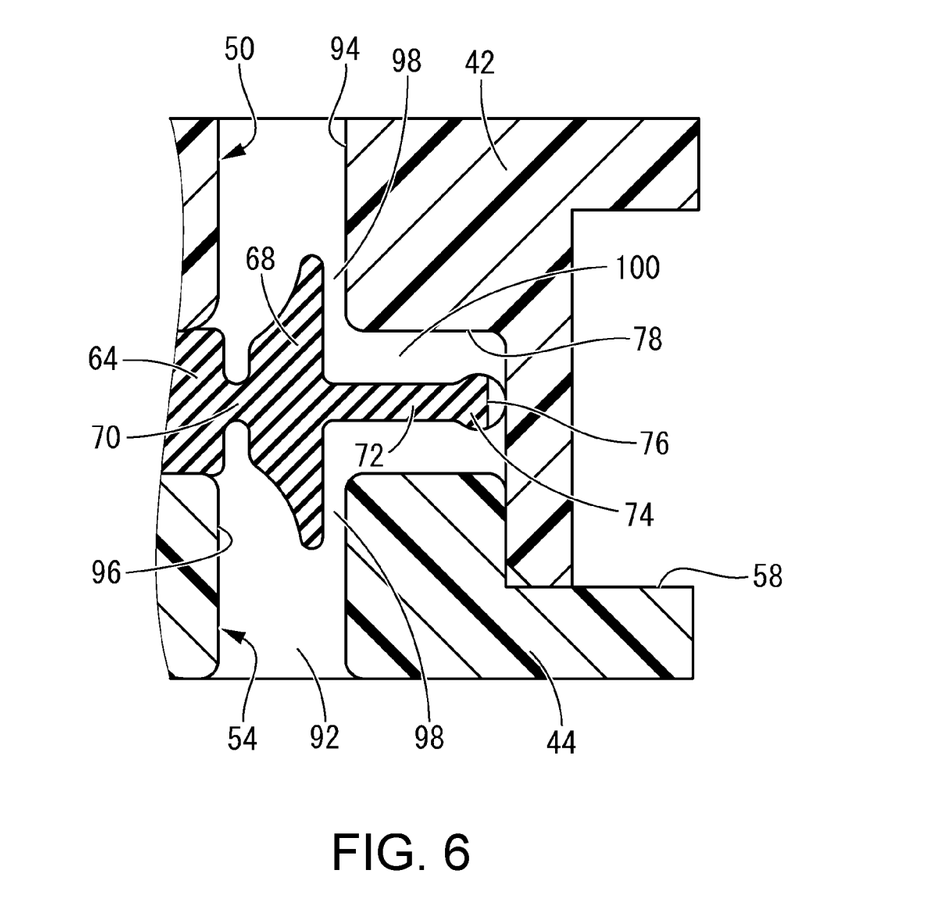
FIG. 6 is an enlarged cross-sectional view showing a part of the engine mount of FIG. 1, showing a state in which an idling vibration is input.

In addition, when a micro-amplitude vibration is input in the low frequency region, the medium frequency region, or the high frequency region as, for example, a traveling vibration, due to deviation from the tuning frequency of the fluid passage 92 and/or due to a micro amplitude that makes it difficult to secure an effective fluid flow rate, even if the fluid flow based on the swinging displacement of the switching valve 68 is suppressed, as shown in FIG. 6, the gaps 98 and 98 between the facing surfaces of the switching valve 68 and the outer peripheral side wall surface 96 of the fluid passage 92 are maintained, and the leak passage 100 including the groove-shaped part 76 is brought into a communicating state. Therefore, since the fluid flow through the leak passage 100 including the groove-shaped part 76 is allowed, the sealing of the pressure receiving chamber 80 is avoided, and the pressure fluctuation in the pressure receiving chamber 80 is relieved to the equilibrium chamber 82, thereby being reduced or eliminated, and the vibration damping effect (vibration insulating effect) due to the low dynamic spring is exhibited. The orifice passage 88 tuned to a low frequency is substantially blocked by antiresonance when a vibration input having a frequency higher than the tuning frequency is input.

Since the switching valve 68 protrudes from the sandwiched part 64 to the outer periphery and the leak passage 100 is provided on the outer peripheral side of the fluid passage 92, the length of the leak passage 100 in the circumferential direction may be increased. Therefore, for example, the passage cross-sectional area of the leak passage 100 may be secured while reducing the distance between the facing surfaces of the switching valve 68 and the fluid passage 92 (the radial width of the gaps 98 and 98). As a result, for example, it is also easy to appropriately set the threshold value for switching the fluid passage 92 by the switching valve 68 while ensuring the amount of fluid flow through the leak passage 100 and thus the properties of the low dynamic spring action at the time of inputting a micro-amplitude vibration.

In the part where the groove-shaped part 76 is formed, the fin-shaped protrusion 72 is separated from the outer peripheral side wall surface the recess 78 in a proximate state. Therefore, the leak passage 100 including the groove-shaped part 76 is not unintentionally blocked, and the vibration damping effect of the leak passage 100 is stably exhibited.

The groove-shaped part 76 configuring the leak passage 100 is formed at the thick tip end part 74 of the fin-shaped protrusion 72 having a relatively large deformation rigidity. As a result, the change in the cross-sectional shape of the groove-shaped part 76 is suppressed, and the passage cross-sectional area of the leak passage 100 is stabilized.

In addition, when a small-amplitude (larger than micro-amplitude) vibration is input in a predetermined frequency region of a low frequency region, a medium frequency region, or a high frequency region as a muffled sound during traveling, for example, due to the deviation from the tuning frequency of the fluid passage 92 and/or the small amplitude at which it is difficult to secure an effective fluid flow amount, the fluid flow based on the swinging displacement of the switching valve 68 is suppressed; and due to the deviation from the tuning frequency of the leak passage 100 and/or the amount of fluid flow through the leak passage 100 including the groove-shaped part 76, the pressure fluctuations in the pressure receiving chamber 80 are not eliminated. Therefore, as shown in FIG. 7, the relative pressure fluctuations of the pressure receiving chamber 80 and the equilibrium chamber 82 are exerted on both surfaces of the fin-shaped protrusion 72, and elastic deformation is caused.

The fluid flows through the gaps 98 and 98 with the elastic deformation of the fin-shaped protrusion 72, and by utilizing such fluid flow action, for example, by utilizing the fluid flow action due to liquid column resonance, it is possible to realize vibration damping properties such as high damping action and low dynamic spring action at the time of input of small-amplitude vibration in a predetermined target frequency range.

Figure 7:
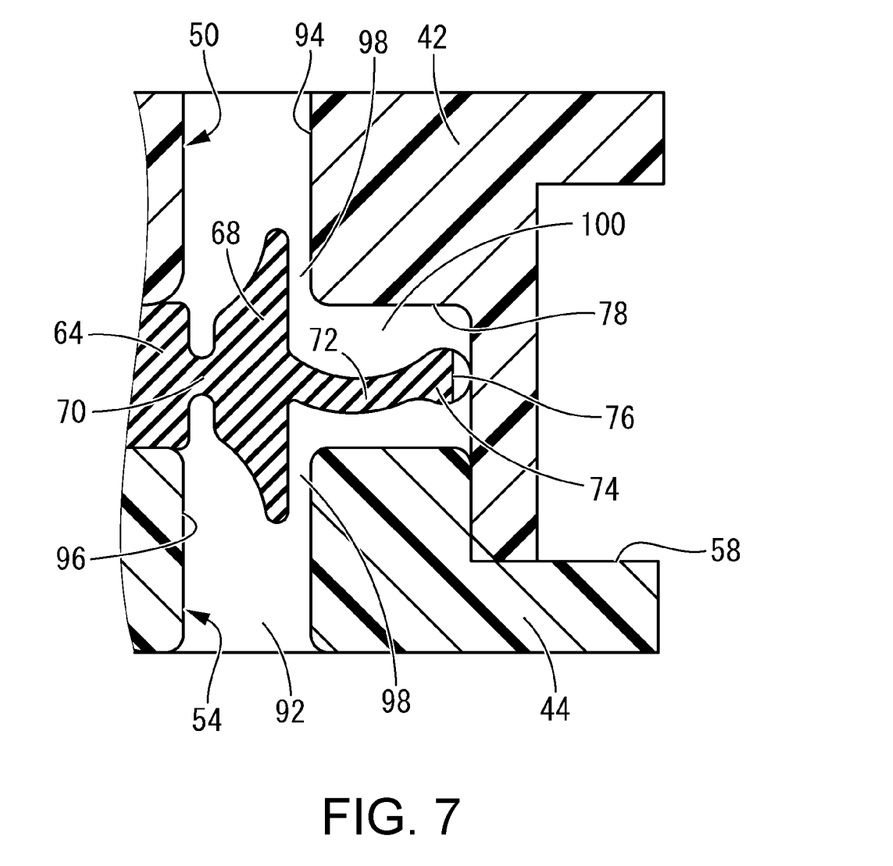
FIG. 7 is an enlarged cross-sectional view of a part of the engine mount of FIG. 1, showing a state in which a vibration intermediate between a shake vibration and an idling vibration is input.

In this embodiment, since the tip end part (thick tip end part 74) of the fin-shaped protrusion 72 is in contact with the wall surface on the outer peripheral side of the recess 78, the fin-shaped protrusion 72 deforms like a double-supported beam with the maximum amount of deformation at the intermediate part in the radial direction (see FIG. 7). However, the deformation mode of the fin-shaped protrusion 72 is not particularly limited, and for example, when the tip end part of the fin-shaped protrusion 72 is separated from the outer peripheral side wall surface of the recess 78, the fin-shaped protrusion 72 may be deformed like a cantilever beam with the maximum amount of deformation at the tip end.

When a small-amplitude vibration is input, the swinging displacement of the switching valve 68 and the parallel displacement in the vertical direction due to the deformation of the thin part 70 cannot follow the amplitude and/or frequency of the input vibration, and hydraulic pressure is prevented from escaping through the fluid passage 92 due to minute displacement of the switching valve 68. Therefore, the fluctuation of the hydraulic pressure acting on the fin-shaped protrusion 72 is increased, and the vibration damping effect due to the elastic deformation of the fin-shaped protrusion 72 is efficiently exhibited.

The fin-shaped protrusion 72 is provided over the entire periphery, and the length in the circumferential direction is increased. Therefore, without increasing the diameter of the partition member 40, it is possible to secure the amount of fluid flow accompanying the deformation of the fin-shaped protrusion 72 and obtain a large vibration damping action, and it is possible to obtain a large degree of freedom in tuning the natural frequency of the fin-shaped protrusion 72.

Since the fin-shaped protrusion 72 enters the recess 78 that opens in the outer peripheral side wall surface 96 of the fluid passage 92, the protruding length (radial width dimension) of the fin-shaped protrusion 72 may be increased without increasing the diameter of the partition member 40. Therefore, the amount of fluid flow accompanying the deformation of the fin-shaped protrusion 72 is secured, the vibration damping effect due to the deformation of the fin-shaped protrusion 72 is greatly exhibited, and the resonance frequency of the deformation of the fin-shaped protrusion 72 may be set with a large degree of freedom.

The fin-shaped protrusion 72 is provided at an intermediate part in the vertical direction of the switching valve 68, and the upper and lower intermediate parts of the switching valve 68 are thicker in the radial direction than the upper and lower end parts. As a result, the switching valve 68 is less likely to be deformed when the fin-shaped protrusion 72 is deformed by the action of hydraulic pressure, as compared with the case where the fin-shaped protrusion 72 protrudes from the upper and lower end parts having a thin wall, and deformation of the protruding part 72 occurs efficiently.

When the internal pressure of the pressure receiving chamber 80 drops significantly due to the input of an impact load or the like, the fluid flow through the relief passage 90 prevents the generation of cavitation noise. That is, the relief valve 66 is deformed based on the difference between the internal pressure of the pressure receiving chamber 80 acting on the upper surface of the relief valve 66 and the internal pressure of the equilibrium chamber 82 acting on the lower surface of the relief valve 66, and the relief valve 66 becomes separated from the inner peripheral side wall surface of the relief passage 90. The blockage by the relief valve 66 of the relief passage 90 is released, the relief passage 90 is brought into a communicating state, and the fluid flows from the equilibrium chamber 82 to the pressure receiving chamber 80 through the relief passage 90, so that the negative pressure of the pressure receiving chamber 80 is quickly reduced or eliminated, and the occurrence of cavitation due to a sudden drop in pressure is prevented.

Further, as described above, in addition to the "vibration damping property against low-frequency large-amplitude vibration achieved by the orifice passage 88," the "vibration damping property against medium-frequency medium-amplitude vibration achieved by the fluid passage 92," the "vibration damping property against the micro-amplitude vibration achieved by the leak passage 100 including the groove-shaped part 76" and the "vibration damping property against the small-amplitude vibration achieved based on the elastic deformation of the fin-shaped protrusion 72," for micro or small amplitude vibrations in a higher frequency range, such as high-speed booming sounds, for example, the switching valve 68 itself operates like a movable film, so that it is also possible to avoid or reduce a significant increase in dynamic spring caused by each passage (such as the orifice passage 88, the fluid passage 92, and the leak passage 100) being substantially blocked by the anti-resonance action of the fluid. That is, since the switching valve 68 has a thin part 70 whose base end is thin and easily deformed, it is also possible to reduce the pressure fluctuation in the pressure receiving chamber 80 and thus the high dynamic spring by utilizing the minute displacement of the switching valve 68 in the vertical direction (fluid flow direction) accompanying the relative pressure fluctuations between the pressure receiving chamber 80 and the equilibrium chamber 82 exerted up and down on the switching valve 68. In general, the target vibrations such as high-speed muffled sounds that are a problem are extremely high-frequency and generally have significantly smaller amplitudes compared with the above-mentioned the "vibration damping property against low-frequency large-amplitude vibration achieved by the orifice passage 88," the "vibration damping property against medium-frequency medium-amplitude vibration achieved by the fluid passage 92," the "vibration damping property against the micro-amplitude vibration achieved by the leak passage 100 including the groove-shaped part 76" and the "vibration damping property against the small-amplitude vibration achieved based on the elastic deformation of the fin-shaped protrusion 72;" therefore, it may also be possible to take advantage of the movable film action of switching valve 68 without significantly adversely affecting the vibration damping properties achieved by each of these devices.

Although the embodiments of the disclosure have been described in detail above, the disclosure is not limited by the specific description thereof. For example, the switching valve 68 may be protruded from the sandwiched part 64 toward the inner periphery, and the fin-shaped protrusion 72 may be provided so as to further protrude from the switching valve 68 toward the inner periphery. Further, the relief valve 66 is not necessarily provided, and for example, an elastic movable body including the sandwiched part 64, the switching valve 68, and the fin-shaped protrusion 72 may be adopted. Further, it is also possible to newly configure a device that exhibits a low dynamic spring action that reduces pressure fluctuations in the pressure receiving chamber 80 when a predetermined vibration is input based on elastic deformation based on relative pressure fluctuations of the pressure receiving chamber 80 and the equilibrium chamber 82 exerted on both upper and lower surfaces of a movable film by using the inner peripheral side of the sandwiched part 64 as the movable film that may be elastically deformed in the plate thickness direction.

It is desirable that the tip end part of the fin-shaped protrusion 72 is thick, but the thick tip end part 74 is not necessarily provided. Further, the fin-shaped protrusion 72 does not have to have a constant thickness dimension other than the tip end part, and may have a thin part or a thick part. Further, the switching valve 68 and the fin-shaped protrusion 72 do not have to be formed over the entire periphery of the elastic movable body 62, and may be partially formed in the circumferential direction. Further, instead of the annular fluid passage 92, a fluid passage that penetrates the partition member 40 vertically in a predetermined cross-sectional shape such as a rectangular cross section is adopted, and a switching valve that protrudes from one wall toward the other wall in the fluid passage may be adopted.

The groove-shaped part 76 is not necessarily provided, and the fin-shaped protrusion 72 may be in contact with the wall surface on the other side of the fluid passage 92 over the entire periphery. In this case, for example, the leak passage 100 is formed by the fin-shaped protrusion 72 being deformed away from the wall surface on the other side of the fluid passage 92. The fin-shaped protrusion 72 may be separated from the wall surface on the other side of the fluid passage 92 over the entire periphery.

For example, the protrusion length dimension of the fin-shaped protrusion 72 may be increased by forming a recess that opens on the outer peripheral surface of the switching valve 68 and providing the fin-shaped protrusion 72 so as to protrude from the bottom surface of the recess.

Further, in the disclosure, the orifice passage 88, the relief passage 90, and the like are optional and do not necessarily have to be provided.

What is claimed is:

1. A fluid-filled vibration damping device having a structure in which a main fluid chamber and a sub fluid chamber filled with a fluid are partitioned by a partition member, the fluid-filled vibration damping device comprising:
    a fluid passage that penetrates the partition member and communicates with the main fluid chamber and the sub fluid chamber,
    wherein the fluid passage is provided with a switching valve that protrudes from one wall surface toward an other wall surface of the fluid passage that face each other, and a gap is provided between the switching valve and the other wall surface,
    the switching valve is tiltable at its base end part, and a tip end part of the switching valve contacts the other wall surface of the fluid passage by a tilt displacement of the switching valve in a swing manner in a passage length direction of the fluid passage to close the gap, to configure a switching mechanism, and
    an elastically deformable fin-shaped protrusion that protrudes from the tip end part of the switching valve toward the other wall surface of the fluid passage is provided, and a leak passage is formed between a protruding tip end part of the fin-shaped protrusion and the other wall surface,
    wherein the fluid-filled vibration damping device further comprises a rubber film sandwiched by the partition member,
    wherein the switching valve protrudes from a sandwiched part of the rubber film toward the other wall surface of the fluid passage and extends in a circumferential direction,
    wherein the switching valve is provided to protrude from the sandwiched part of the rubber film to an outer peripheral side over an entire periphery, and the fin-shaped protrusion is provided to protrude on an outer peripheral surface of the switching valve over the entire periphery.

2. The fluid-filled vibration damping device according to claim 1, wherein the other wall surface of the fluid passage is provided with a recess, and the fin-shaped protrusion enters the recess.

3. The fluid-filled vibration damping device according to claim 2, wherein the tip end part of the fin-shaped protrusion has a thick tip end part that is thicker than a base end part of the fin-shaped protrusion in the passage length direction of the fluid passage.

4. The fluid-filled vibration damping device according to claim 2, wherein the tip end part of the fin-shaped protrusion is a proximate part in which at least a part in the circumferential direction is separated from the other wall surface of the fluid passage, and the proximate part forms the leak passage.

5. The fluid-filled vibration damping device according to claim 1, wherein the fin-shaped protrusion is in contact with the other wall surface of the fluid passage over the entire periphery, and the fin-shaped protrusion is separated from the other wall surface by elastic deformation to form the leak passage.

6. The fluid-filled vibration damping device according to claim 1, wherein the tip end part of the switching valve has a shape extending to both sides in the passage length direction of the fluid passage, and
    the fin-shaped protrusion protrudes from an intermediate part of the tip end part of the switching valve in the passage length direction of the fluid passage.

7. The fluid-filled vibration damping device according to claim 1, further comprising an orifice passage that communicates the main fluid chamber and the sub fluid chamber with each other,
    wherein the resonance frequency of a fluid flow through the orifice passage is lower than the resonance frequency of a fluid flow through the fluid passage.

8. A fluid-filled vibration damping device having a structure in which a main fluid chamber and a sub fluid chamber filled with a fluid are partitioned by a partition member, the fluid-filled vibration damping device comprising:
    a fluid passage that penetrates the partition member and communicates with the main fluid chamber and the sub fluid chamber,
    wherein the fluid passage is provided with a switching valve that protrudes from one wall surface toward an other wall surface of the fluid passage that face each other, and a gap is provided between the switching valve and the other wall surface,
    the switching valve is tiltable at its base end part, and a tip end part of the switching valve contacts the other wall surface of the fluid passage by a tilt displacement of the switching valve in a swing manner in a passage length direction of the fluid passage to close the gap, to configure a switching mechanism, and
    an elastically deformable fin-shaped protrusion that protrudes from the tip end part of the switching valve toward the other wall surface of the fluid passage is provided, and a leak passage is formed between a protruding tip end part of the fin-shaped protrusion and the other wall surface, wherein the tip end part of the fin-shaped protrusion has a thick tip end part that is thicker than a base end part of the fin-shaped protrusion in the passage length direction of the fluid passage.

9. A fluid-filled vibration damping device having a structure in which a main fluid chamber and a sub fluid chamber filled with a fluid are partitioned by a partition member, the fluid-filled vibration damping device comprising:

a fluid passage that penetrates the partition member and communicates with the main fluid chamber and the sub fluid chamber, wherein the fluid passage is provided with a switching valve that protrudes from one wall surface toward an other wall surface of the fluid passage that face each other, and a gap is provided between the switching valve and the other wall surface, the switching valve is tiltable at its base end part, and a tip end part of the switching valve contacts the other wall surface of the fluid passage by a tilt displacement of the switching valve in a swing manner in a passage length direction of the fluid passage to close the gap, to configure a switching mechanism, and an elastically deformable fin-shaped protrusion that protrudes from the tip end part of the switching valve toward the other wall surface of the fluid passage is provided, and a leak passage is formed between a protruding tip end part of the fin-shaped protrusion and the other wall surface, wherein the tip end part of the fin-shaped protrusion is a proximate part in which at least a part in the circumferential direction is separated from the other wall surface of the fluid passage, and the proximate part forms the leak passage.

* * * * *